(12) United States Patent
Matsuoka et al.

(10) Patent No.: US 8,366,851 B2
(45) Date of Patent: Feb. 5, 2013

(54) METHOD FOR MANUFACTURING TIRE

(75) Inventors: Mamoru Matsuoka, Osaka (JP);
Hiroshi Ikegami, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 235 days.

(21) Appl. No.: 12/438,379

(22) PCT Filed: Aug. 28, 2006

(86) PCT No.: PCT/JP2006/316872
§ 371 (c)(1),
(2), (4) Date: Feb. 23, 2009

(87) PCT Pub. No.: WO2008/026240
PCT Pub. Date: Mar. 6, 2008

(65) Prior Publication Data
US 2009/0188608 A1 Jul. 30, 2009

(51) Int. Cl.
*B29D 30/30* (2006.01)
*B29D 30/60* (2006.01)

(52) U.S. Cl. ........................... 156/117; 156/425

(58) Field of Classification Search .......... 156/117, 156/397, 187, 195, 350, 356, 361, 368, 391, 156/425, 448
See application file for complete search history.

(56) References Cited

U.S. PATENT DOCUMENTS

| | | | | |
|---|---|---|---|---|
| 3,874,974 A | * | 4/1975 | Simmons, Jr. | 156/353 |
| 4,650,618 A | * | 3/1987 | Heinemann et al. | 264/431 |
| 5,395,475 A | * | 3/1995 | Ozawa et al. | 156/397 |
| 6,412,532 B1 | * | 7/2002 | Iida et al. | 152/209.5 |
| 2004/0177909 A1 | * | 9/2004 | Tsukagoshi et al. | 152/339.1 |
| 2005/0183810 A1 | * | 8/2005 | Abe et al. | 156/117 |

FOREIGN PATENT DOCUMENTS

| | | | |
|---|---|---|---|
| DE | 19718699 | * | 5/1998 |
| JP | 05-177738 | | 7/1993 |
| JP | 07-251466 | | 10/1995 |
| JP | 10-193475 | | 7/1998 |

(Continued)

OTHER PUBLICATIONS

Machine Generated English Translation for JP2004-338621.*

(Continued)

*Primary Examiner* — Richard Crispino
*Assistant Examiner* — Martin Rogers
(74) *Attorney, Agent, or Firm* — Fish & Richardson P.C.

(57) ABSTRACT

This invention provides a method for manufacturing a tire in which the time necessary for the manufacture can be reduced without deteriorating uniformity in manufacturing the tire by a strip-build process. The method for manufacturing the tire comprises discharging a strip rubber (S) having a predetermined sectional shape by rubber discharging devices (A1, A2) while rotating a molding drum (B), and successively winding the discharged strip rubber (S) around the molding drum (B) to mold the rubber into a tire shape. The method comprises the step of disposing, around the radial direction of the molding drum (B), at least two rubber discharging devices of a first rubber discharging device (A1) and a second rubber discharging device (A2) in such a state that the phase is shifted in the circumferential direction, and conducting winding in such a state that a first strip rubber (S1) discharged by the first rubber discharging device (A1) and a second strip rubber (S2) discharged by the second discharging device (A2) are overlapped with each other by a predetermined degree in the widthwise direction of the molding drum (B).

6 Claims, 13 Drawing Sheets

FOREIGN PATENT DOCUMENTS

| | | | |
|---|---|---|---|
| JP | 2001-072335 | | 3/2001 |
| JP | 2002-46194 | | 2/2002 |
| JP | 2004-25535 | * | 1/2004 |
| JP | 2004-338621 | * | 12/2004 |
| JP | 2004-358738 | | 12/2004 |

OTHER PUBLICATIONS

Machine Generated English Translation for JP2004-25535.*
Machine Generated English translation for DE19718699.*
Machine-generated English translation of JP 2004-338621.*
Machine-generated English translation of JP 07-251466.*
European Office Action for Application No. 06783101.6-2307, Mar. 2, 2010, 2 pages.
Form PCT/IB/338 Notification of Transmittal of Copies of Translation of the IPER (Mar. 12, 2009).
Form PCT/IB/373 International Preliminary Report on Patentability (IPER) (Mar. 12, 2009).
Form PCT/ISA/237 Written Opinion of the International Searching Authority (Mar. 12, 2009).
Japanese Office Action for Application No. 2008-531900, dated Nov. 16, 2010, 4 pages.
European Communication for Application No. 06783101.6, dated Nov. 9, 2010, 3 pages.
Supplementary European Search Report for Application No. 06783101.6, dated Nov. 30, 2009, 3 pages.

* cited by examiner

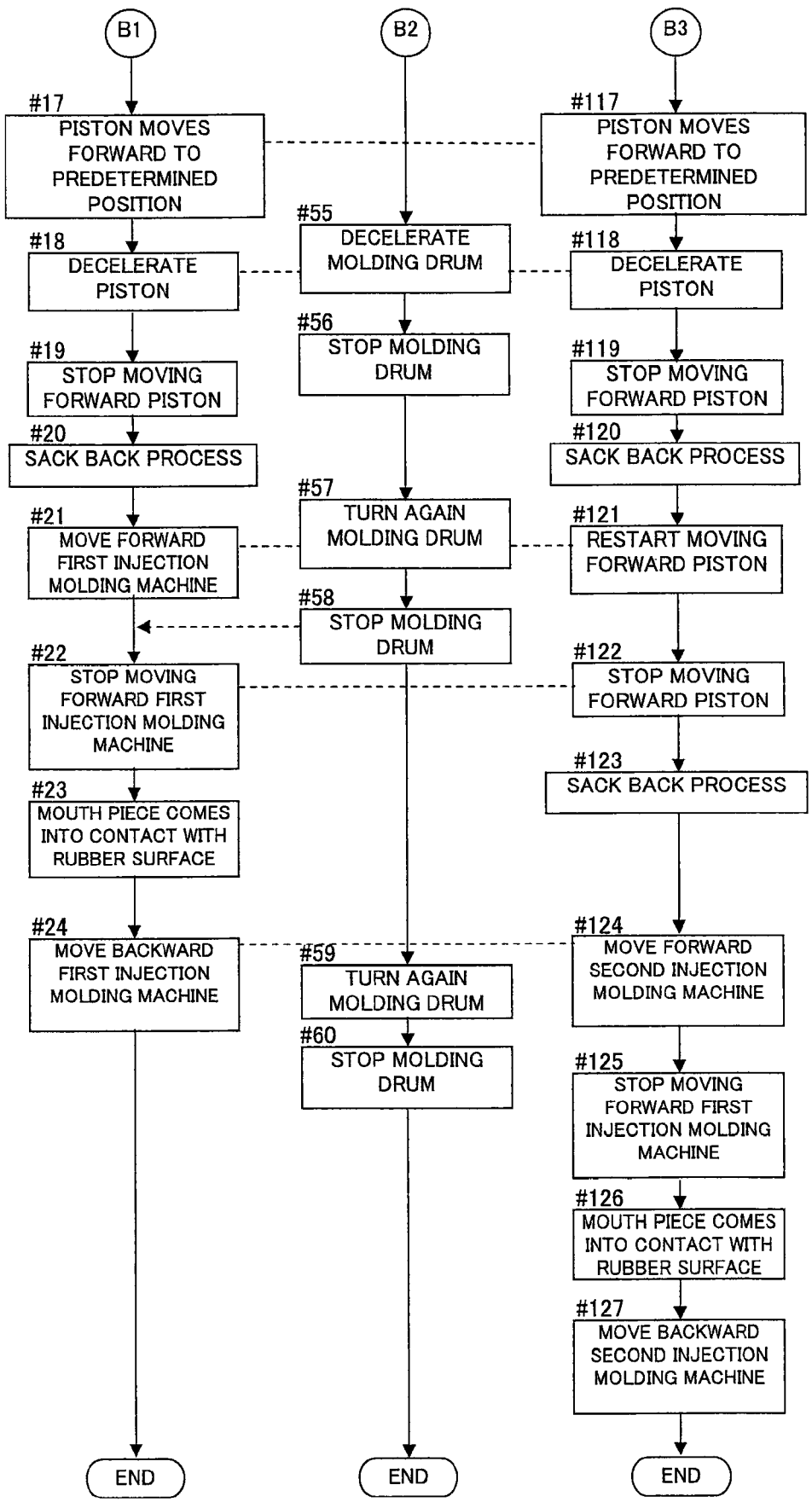

(a)

(b)

METHOD FOR MANUFACTURING TIRE

TECHNICAL FIELD

The present invention relates to a tire manufacturing method for forming a tire shape by discharging a strip rubber having a predetermined cross sectional shape by a rubber discharging apparatus while turning a molding drum, and sequentially winding the discharged strip rubber around the molding drum.

BACKGROUND ART

There has been known a so-called strip build construction method for manufacturing a green tire by repeatedly winding a strip rubber having a predetermined cross sectional shape around a surface of a molding drum (for example, Japanese Unexamined Patent Publication No. 2004-358738). In accordance with this strip build, for example, it is possible to form a tire member having a desired cross sectional shape by sequentially laminating the strip rubber having a thin rectangular cross sectional shape on the molding drum. In the conventional art mentioned above, there is employed a rubber mixing extruder using a gear pump, and it is possible to continuously extrusion mold the strip rubber having the predetermined cross sectional shape. Further, a strip build construction method using an injection molding machine is disclosed, for example, in Japanese Unexamined Patent Publication No. 2001-72335.

DISCLOSURE OF THE INVENTION

Problems to be Solved by the Invention

FIG. 7 shows a state at a time of winding a strip rubber S around a molding drum. In FIG. 7, a lateral direction corresponds to a width direction of the molding drum (a width direction of a tire), and a rotating shaft of the molding drum is set in the lateral direction in the same manner. It is possible to mold a tire having a desired cross sectional shape by reciprocating a rubber discharging apparatus (not shown) discharging the strip rubber S or the molding drum in the lateral direction while turning the molding drum. In this case, a cross sectional shape of the strip rubber S is formed as a rectangular shape having a predetermined width dimension and a predetermined thickness.

FIG. 7(a) shows a winding aspect in the case where a width w1 of the strip rubber S is large, and FIG. 7(b) shows a winding aspect in the case where a width w2 of the strip rubber S is small. In order to make a time for manufacturing the tire short, it is preferable to make the width dimension of the strip rubber large. Since a winding frequency is increased by making the width dimension short, it also takes a long time to manufacture. However, if the width dimension of the strip rubber S is made large, there is a problem that a winding angle becomes large. In other words, a relation α>β is established as shown in FIG. 7, and the larger the angle is, the larger an amount of a doubly overlapping portion is in a winding start and a winding end of the strip rubber S (refer to a hatched part in FIG. 7(a)). Further, there is considered a method of trimming the over lapping portion, however, a trimming amount becomes large in accordance with an increase of the angle, and a waste of a material is increased. As a result, there is a possibility of adversely affecting a uniformity of the tire and a yield ratio of the material.

Accordingly, taking into consideration the points of the uniformity and the yield ratio of the material, it is preferable to make the width dimension of the strip rubber S as small as possible so that the winding angle comes close to 90 degrees, however, there is a problem that a manufacturing time becomes long.

The present invention is made by taking the actual condition mentioned above into consideration, and an object of the present invention is to provide a tire manufacturing method which can shorten a manufacturing time without deteriorating a uniformity and a yield ratio of a material, at a time of manufacturing a tire in accordance with a strip build construction method.

Means for Solving the Problems

In order to solve the above object, in accordance with the present invention, there is provided a tire manufacturing method for forming a tire shape by discharging a strip rubber having a predetermined cross sectional shape by a rubber discharging apparatus while turning a molding drum, and sequentially winding the discharged strip rubber around the molding drum, including a step of arranging at least two rubber discharging apparatuses including a first rubber discharging apparatus and a second rubber discharging apparatus around a diametrical direction of the molding drum in a state in which phases are shifted in a peripheral direction, and winding in a state of overlapping a first strip rubber discharged from the first rubber discharging apparatus and a second strip rubber discharged from the second rubber discharging apparatus at a predetermined amount in a width direction of the molding drum.

A description will be given of an operation and an effect of the tire manufacturing method in accordance with the structure. In the strip build construction method, the strip rubber having the predetermined cross sectional shape is sequentially wound around the surface of the molding drum while turning the molding drum. In order to directly wind the strip rubber around the molding drum, the rubber discharging apparatus is arranged around the diametrical direction of the molding drum. In the present invention, at least two rubber discharging apparatuses are arranged. In other words, the first rubber discharging apparatus and the second rubber discharging apparatus are arranged in a state in which their phases are shifted in the peripheral direction. In the case of winding, the winding is carried out in a state in which the first strip rubber discharged from the first rubber discharging apparatus and the second strip rubber discharged from the second rubber discharging apparatus are overlapped by the predetermined amount in the width direction of the molding drum. Accordingly, there is achieved the same state as a state of being wound by a strip rubber having a substantially large width. Therefore, even in the strip rubber having a small width dimension, the manufacturing time does not become long. Further, since it is possible to use the strip rubber having the small width dimension, it is not necessary to enlarge the winding angle. As a result, it is possible to provide the tire manufacturing method which can shorten the manufacturing time without deteriorating the uniformity and the yield ratio of the material, at a time of manufacturing the tire in accordance with the strip build construction method.

In the present invention, it is preferable that the first rubber discharging apparatus and the second rubber discharging apparatus are arranged in the peripheral direction of the molding drum in such a manner that their phases are shifted by 90 degrees to 180 degrees.

In the case of directly winding the strip rubber around the molding drum, it is necessary to provide a mechanism and a space for relatively moving the rubber discharging apparatus with respect to the molding drum. Further, it is necessary to provide a space for arranging the rubber discharging apparatus itself. Accordingly, it is preferable to arrange the first rubber discharging apparatus and the second rubber discharging apparatus in the peripheral direction in such a manner as to shift their phases by 90 degrees to 180 degrees. Therefore, it is possible to suitably arrange each of the rubber discharging apparatuses while taking into consideration an arrangement space of a whole equipment.

In the present invention, it is preferable to further include a step of detecting a fact that an end portion of the strip rubber wound by the first rubber discharging apparatus reaches a position of the second rubber discharging apparatus, at a time of starting a winding motion of the strip rubber.

In the case of arranging so as to shift the phases in the peripheral direction, first of all, the discharge of the strip rubber is started by the first rubber discharging apparatus. Since the molding drum turns, a discharge end portion of the strip rubber is going to move to the second rubber discharging apparatus. Further, there is provided the step of detecting the fact that the end portion of the strip rubber reaches the position of the second rubber discharging apparatus. The detecting step mentioned above can be carried out based on a sensor or the like detecting an angle of rotation of the molding drum and the rubber. Accordingly, it is possible to wind the first strip rubber and the second strip rubber in a suitably overlapping state.

It is preferable that the rubber discharging apparatus in accordance with the present invention is constituted by a rubber mixing extruder.

It is possible to continuously discharge the strip rubber by the rubber mixing extruder. The rubber mixing extruder may have a gear pump or may not have the gear pump.

It is preferable that the rubber discharging apparatus in accordance with the present invention is constituted by a rubber injection molding machine.

If it is intended to extrude the thin strip rubber by the rubber mixing extruder, a very high molding pressure is necessary. Since the molding pressure exceeds a withstand pressure of the gear pump by far, it is impossible to extrude the thin strip rubber at a high speed. Accordingly, it is possible to discharge the thin strip rubber by using the injection molding machine.

In the case of using the injection molding machine, it is preferable to have the following structure. In other words, it is preferable that the injection molding machine is provided with a material supply port to which the rubber material is input, a screw which discharges the input rubber material forward in an axial direction while mixing, a material infilling chamber arranged in a leading end side of the screw and in which the mixed rubber material is filled, and a material passage supplying the rubber material from the leading end side of the screw to the material infilling chamber.

In the case of using the injection molding machine mentioned above, the strip rubber is wound around the molding drum, by a step of supplying the rubber material from the material supply port so as to discharge the rubber material forward while mixing by the screw, and filling the rubber material in the material infilling chamber via the material passage, a step of moving backward both the screw and the material supply port in accordance with the infilling motion of the rubber material in the material infilling chamber, and a step of moving forward the screw so as to discharge the strip rubber having the predetermined cross sectional shape to the molding drum from the material infilling chamber, after the rubber material is filled in the material infilling chamber at a predetermined amount.

In accordance with the injection molding machine, if the rubber material is input from the material supply port, the rubber material is discharged forward while being mixed by the screw. The forward moved rubber material is fed to the material infilling chamber via the material passage in the leading end side of the screw. The screw is moved backward little by little in accordance that the rubber material is filled in the material infilling chamber. At this time, there is employed such a structure that the material supply port is moved backward together with the screw. Accordingly, a relative positional relation between the screw and the material supply port is not changed regardless of an input timing of the rubber material. If the rubber material is filled in the material infilling chamber at the predetermined amount, the screw is moved forward, and the strip rubber having the predetermined cross sectional shape is injected to the surface of the molding drum from the material infilling chamber. In other words, the screw doubles as a function of a piston. The tire shape is going to be formed on the molding drum by discharging the strip rubber while turning the molding drum.

The injection molding machine used in this case is an injection molding machine of a type making the screw function as the piston. In other words, it has a so-called first-in first-out structure, a retention time of the rubber material within the material infilling chamber becomes constant regardless of the input timing of the rubber material. Accordingly, the rubber material is injected from an injection port in a state in which a degree of plasticity of the rubber material is fixed. Further, since the relative positional relation between the screw and the rubber supply port is not changed, it is possible to make a degree of mixing of the rubber material constant. As a result, it is possible to discharge the strip rubber from the injection port in a state in which the degree of plasticity and the degree of mixing are even, regardless of a timing at which the rubber material is input.

In the injection molding machine in accordance with the present invention, it is preferable that the injection molding machine is provided with an opening and closing mechanism which is attached to the leading end side of the screw and is capable of opening and closing the material passage, a first cylinder portion which surrounds the screw, and a material supply port which is attached to the first cylinder portion, the first cylinder portion is slidable with respect to a second cylinder portion, and the first cylinder portion and the screw work with each other so as to be movable in a longitudinal direction, and there are provided with a step of closing the material passage by the opening and closing mechanism after the rubber material is filled in the material infilling chamber at a predetermined amount, and a step of discharging the strip rubber by pressing the rubber material in the material infilling chamber by a leading end side portion of the opening and closing mechanism and a leading end portion of the first cylinder portion.

In accordance with this structure, the opening and closing mechanism is provided in the screw leading end side and can control so as to open and close the material passage. At a time of inputting the rubber material so as to fill in the material infilling chamber, the material passage is left open, and at a time of forward moving the screw so as to inject the strip rubber, the material passage is closed. Further, the screw is accommodated in an inner portion of the first cylinder portion, and the material supply port is attached to the first cylinder portion. Further, the first cylinder portion is structured so as to be slidable with respect to the second cylinder portion, and the first cylinder portion, the screw and the material supply port can be integrally moved forward and backward relatively with respect to the second cylinder portion. If the opening and closing mechanism is closed, both of the leading end portion of the first cylinder portion and the leading end side portion of the opening and closing mechanism can serve as the piston. In other words, it is possible to secure a greater pressing area, and it is possible to efficiently discharge the strip rubber.

BRIEF DESCRIPTION OF THE DRAWINGS

FIG. 6C is a flow chart (3) explaining the tire manufacturing step.

DESCRIPTION OF REFERENCE SYMBOLS

Figure 1:
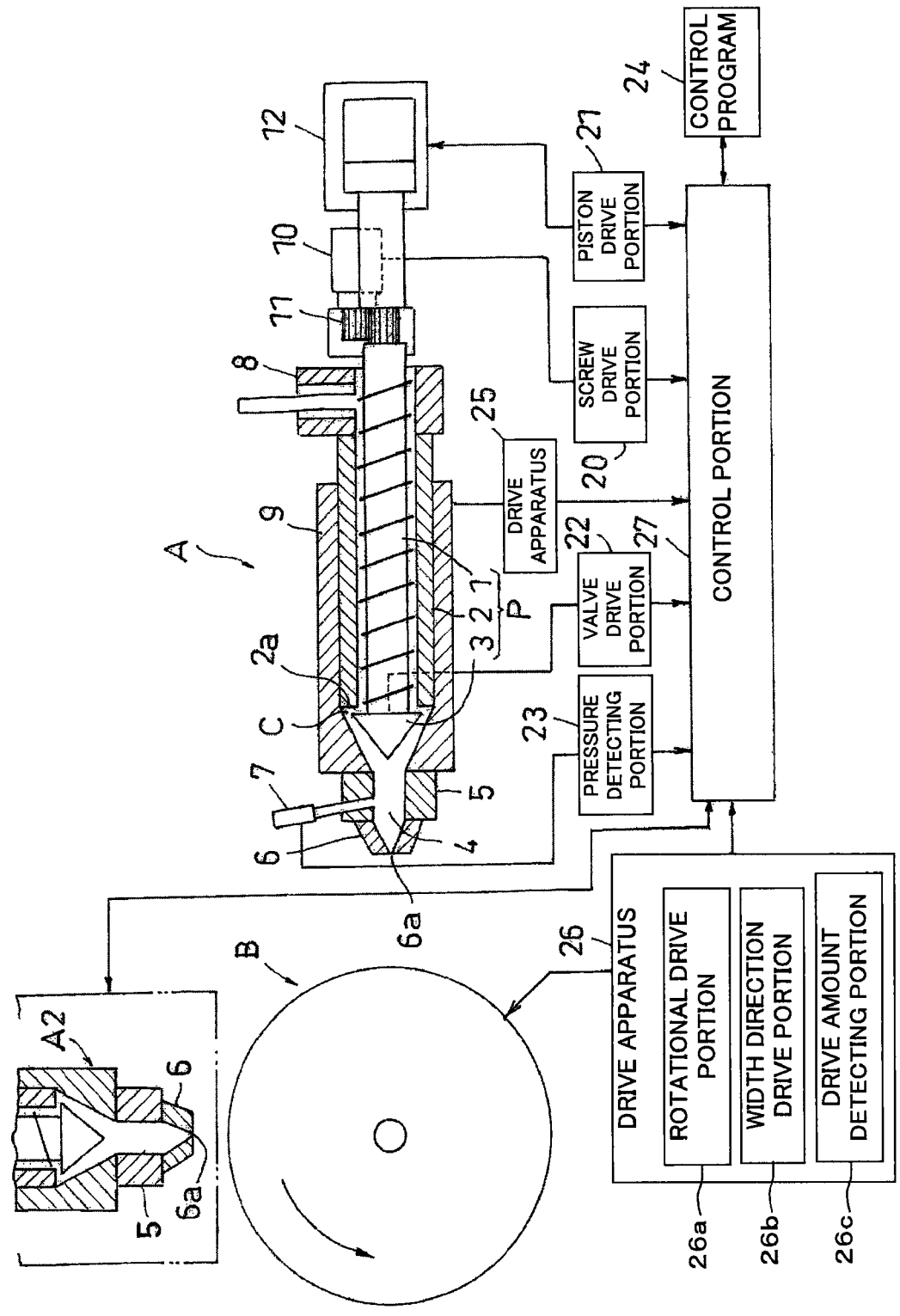
FIG. 1 is a schematic view showing a structure of a green tire manufacturing equipment.

A1, A2 injection molding machine
B molding drum
C material passage
S strip rubber
P piston
1 screw
2 first cylinder
2a leading end surface
3 chuck valve
4 material infilling chamber
5 member
6 mouth piece
6a injection port
7 pressure sensor
8 material supply port
9 second cylinder
10 servo motor
11 gear
12 hydraulic servo motor
27 control portion

BEST MODE FOR CARRYING OUT THE INVENTION

A description will be given of a preferable embodiment of a tire manufacturing method in accordance with the present invention with reference to the accompanying drawings. FIG. 1 is a schematic view showing a structure of a manufacturing equipment used for manufacturing a tire.

<Structure of Manufacturing Equipment>

In the present invention, manufacturing of a green tire is carried out by a strip build construction method. The strip build can manufacture a tire having a desired shape by discharging a strip rubber having a small cross sectional area onto a molding drum, and winding the strip rubber around the molding drum. It is possible to manufacture a tire having a precise cross sectional shape by making the cross sectional area of the strip rubber smaller. As mentioned above, in the case of using the extruder, it is hard to extrude the thin strip rubber. Accordingly, the strip rubber is injected (discharged) by using the injection molding machine.

As shown in FIG. 1, the manufacturing equipment is constructed by a first injection molding machine A1, a second injection molding machine A2 (they correspond to the rubber discharging apparatus), and a molding drum B. The first injection molding machine A1 is installed transversely, and a screw 1 is arranged along an axis. The second injection molding machine A2 is vertically installed, and the screw is vertically arranged. The first injection molding machine A1 and the second injection molding machine A2 are arranged in a state in which their phases are shifted by 90 degrees in a peripheral direction of the molding drum B. In this case, in the present embodiment, since the first injection molding machine A1 and the second injection molding machine A2 employ the same structure, a description will be given only of the first injection molding machine A1.

The screw 1 in the first injection molding machine A1 has a function of discharging an input rubber material forward (in a direction from a right side to a left side in FIG. 1) while mixing. The screw 1 is installed in an inner portion of a first cylinder 2 (corresponding to the first cylinder portion), and a space through which the rubber material passes is formed between an inner wall surface of the first cylinder 2 and an outer surface of the screw 1.

A chuck valve 3 (corresponding to the opening and closing mechanism) is provided in a leading end portion of the screw 1, and carries out an opening and closing control of a material passage C passing the rubber material between a back surface side of the chuck valve 3 and a leading end surface 2a of the first cylinder 2. In FIG. 1, the material passage C is in an open state, and the rubber material mixed by the screw 1 can pass therethrough.

A material infilling chamber 4 is provided in a leading end side of the chuck valve 3, and the rubber material passing through the material passage C is filled in the material in filling chamber 4. The material infilling chamber 4 is formed in an internal space of a member 5. A mouth piece 6 is provided in a leading end side of the member 5, and an injection port 6a is formed in the mouth piece 6. The injection port 6a is manufactured in a shape corresponding to a cross sectional shape of the discharged strip rubber. Further, there is provided a pressure sensor for detecting a rubber pressure within the material infilling chamber 4.

A material supply port 8 is integrally attached to a rear end side of the first cylinder 2, and the rubber material is input therefrom. The rubber material is input in an appropriate form such as a ribbon shape or the like. The first cylinder 2 is fitted to an inner wall surface of the second cylinder 9, and the first cylinder 2 can slide in a longitudinal direction along an inner wall surface of the second cylinder 9.

A servo motor 10 is provided for rotationally driving the screw 1, and is coupled via a gear 11. Further, a hydraulic serve motor 12 is provided for moving forward and backward the screw 1. The hydraulic servo motor 12 is coupled to a rear end portion of the screw 1. Further, the screw 1, the first cylinder 2, the chuck valve 3, the servo motor 10 and the gear 11 are constructed by an integrated unit, and a whole of the unit is moved forward and backward by the hydraulic servo motor 12. If the screw 1, the first cylinder 2 and the chuck valve 3 move forward, it is possible to inject the rubber material within the material infilling chamber 4 from the injection port 6a. Accordingly, the screw 1, the second cylinder 2 and the chuck valve 3 serve as a piston P.

A screw drive portion 20 is constructed by a drive circuit or the like driving the servo motor 10. Further, it is possible to obtain a drive amount of the servo motor 10 based on a signal of an encoder, whereby it is possible to control a rotating speed of the screw 1. A piston drive portion 21 is constructed by a drive circuit or the like driving the hydraulic servo motor 12. Further, a drive amount of the servo motor 12 can be obtained from a signal of the encoder, and it is possible to monitor a position in a longitudinal direction of the screw 1. A valve drive portion 22 has a function of controlling an opening and closing drive of the chuck valve 3. A pressure detecting portion 23 detects a pressure of the rubber within the material infilling chamber 4 based on a signal from a pressure sensor 7. A control program 24 is a program for making the injection molding machines A1 and A2 and the molding drum B carry out a desired motion.

A drive apparatus 25 is an apparatus for driving so as to move a whole of the injection molding machine A1 close to and away from the molding drum B. In the case of making the molding drum B carry out a winding motion of the strip rubber, the winding motion is carried out in a state in which the injection molding machine A1 is moved close to the molding drum B.

The molding drum B is driven by a drive apparatus 26. The drive apparatus 26 is constructed by a servo motor, a decelerating mechanism for coupling the servo motor to the molding drum B, a drive circuit and the like. A rotational drive portion 26a turns the molding drum B in an illustrated counterclockwise direction in the case of winding the strip rubber around the molding drum B. A width direction drive portion 26b reciprocates the molding drum B in a tire width direction (a direction which is vertical to a paper surface in FIG. 1). In the case of winding the strip rubber around the molding drum B, it is necessary to reciprocate the molding drum B along a width direction while turning the molding drum B. In this case, in place of the movement of the molding drum B in the width direction, the injection molding machines A1 and A2 may be moved in the width direction. A drive amount detecting portion 26c detects an amount of rotation and an amount of movement in the width direction of the molding drum B. The detection may be carried out by an encoder provided in the drive apparatus 26.

A control portion 27 is structured such as to generally control the motions of the injection molding machines A1 and A2 and the molding drum B, and carries out various controls based on the control program 24, the pressure detected by the pressure detecting portion 23, the amount of movement of the screw 1, and the like. Further, the motions of the first injection molding machine A1 and the second injection molding machine A2 can be individually and independently controlled. Further, it is necessary to actuate the first injection molding machine A1 and the second injection molding machine A2 so as to work with each other, and such a ganged operation is controlled.

Figure 2:
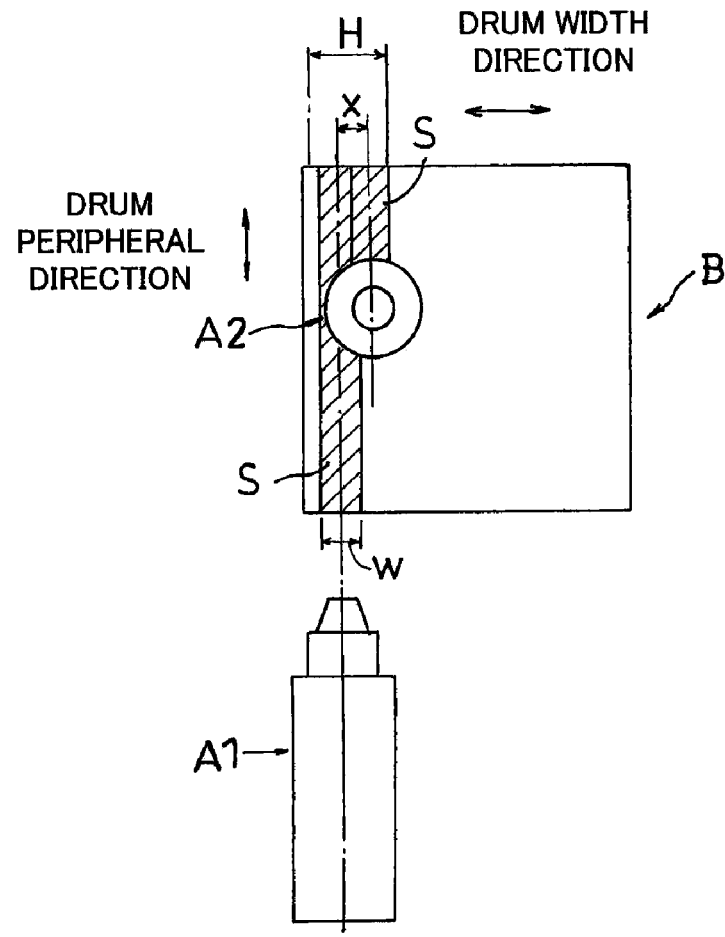
FIG. 2 is a view showing an arrangement structure of an injection molding machine as seen from a front surface side of a molding drum.

FIG. 2 is a view as seen from an outer surface side (a strip rubber wound surface side) of the molding drum B. As illustrated, the first injection molding machine A1 and the second injection molding machine A2 are arranged in such a manner that their phases are differentiated by 90 degrees in a drum peripheral direction. Further, they are arranged in such a manner as to be shifted by a dimension x in a drum width direction (a tire width direction). In the case of setting a width of a wound strip rubber S to w, x comes to a little smaller value than w. Because the adjacent strip rubbers S are wound in a state of being somewhat overlapped. Accordingly, the value of x is defined in correspondence to the width w of the strip rubber S. Further, the structure is made such that the arranged positions of the injection molding machines A1 and A2 can be adjusted in such a manner as to correspond to various values of w.

In the present invention, the winding work in accordance with the strip build construction method is carried out by using two injection molding machines A1 and A2. The width of the individual strip rubber S is set to w, however, since two injection molding machines A1 and A2 are simultaneously used, it is substantially identical to the case of discharging the strip rubber S having a width dimension H. Therefore, it is possible to quickly carry out the winding step of the strip rubber S.

Figure 3:
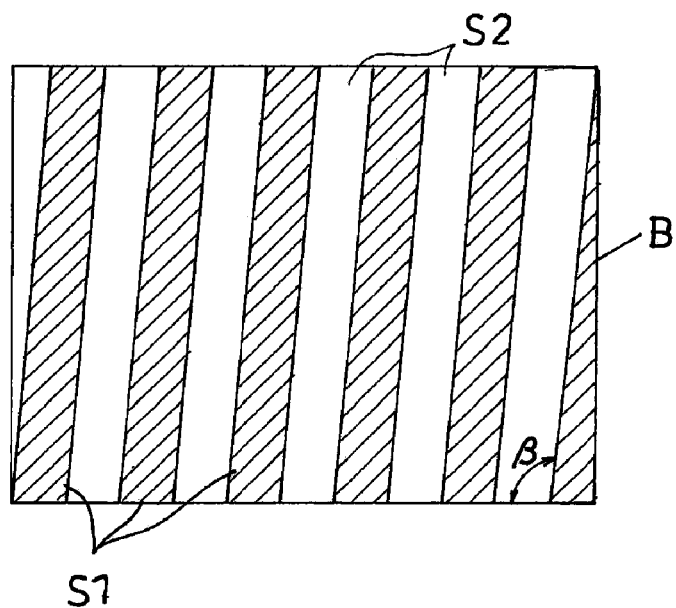
FIG. 3 is a view showing a state in which a strip rubber is wound around the molding drum.

FIG. 3 is a view showing a state in which the strip rubber is wound around a whole region in the width direction of the molding drum B. The strip rubber wound by the first injection molding machine A1 is denoted by reference symbol S1 (shown by a hatched line), and the strip rubber wound by the second injection molding machine A2 is denoted by reference symbol S2. A winding angle β becomes smaller (closer to 90 degrees) than the case of winding a wide strip rubber. Accordingly, an amount of a doubly overlapping portion becomes small in a winding start and a winding end of the strip rubber S. Further, in the case of trimming the overlapping portion, it is possible to reduce a trimming amount. Accordingly, it is possible to set a uniformity of the tire to a predetermined quality, and it is possible to improve a yield ratio of the material.

<Tire Manufacturing Step>

Figure 5A:
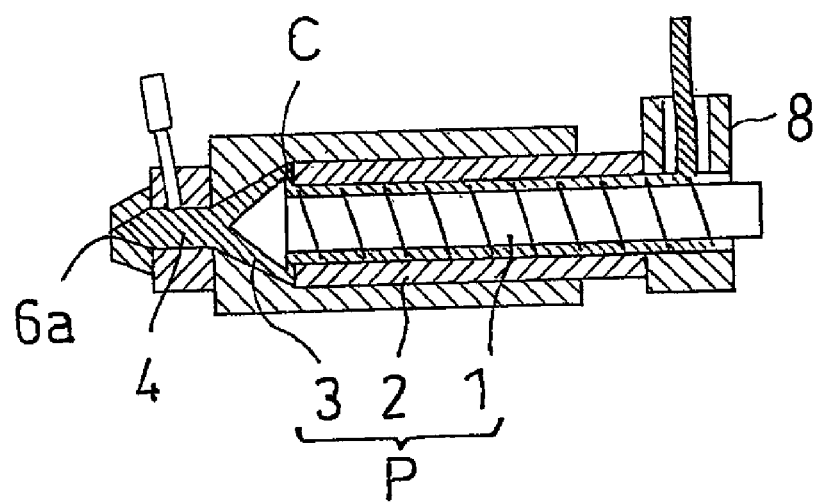
FIG. 5A is a view (1) showing an internal motion of the injection molding machine.
Figure 5B:
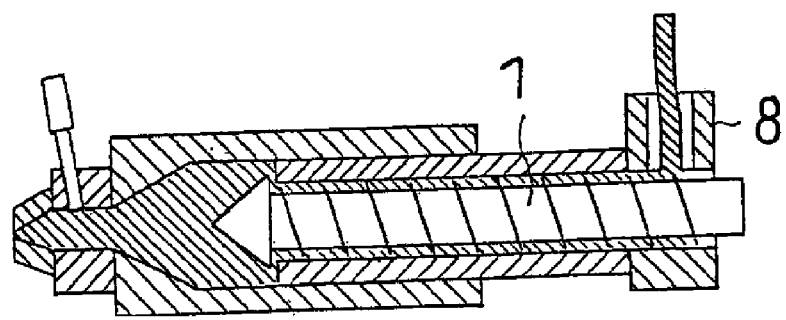
FIG. 5B is a view (2) showing the internal motion of the injection molding machine.
Figure 5C:
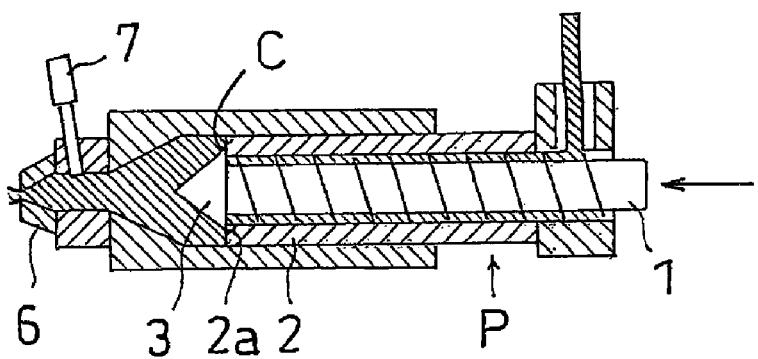
FIG. 5C is a view (3) showing the internal motion of the injection molding machine.
Figure 5D:
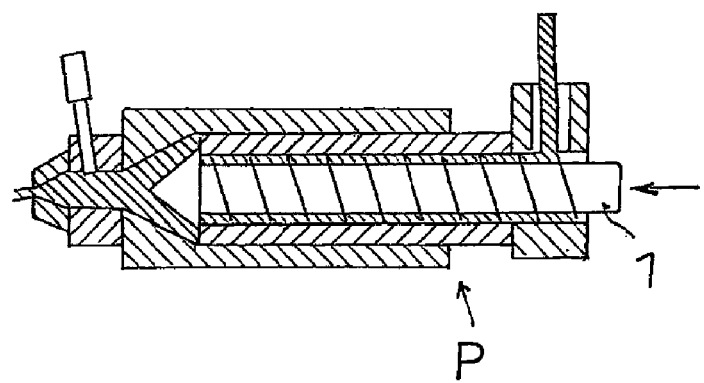
FIG. 5D is a view (4) showing the internal motion of the injection molding machine.
Figure 6A:
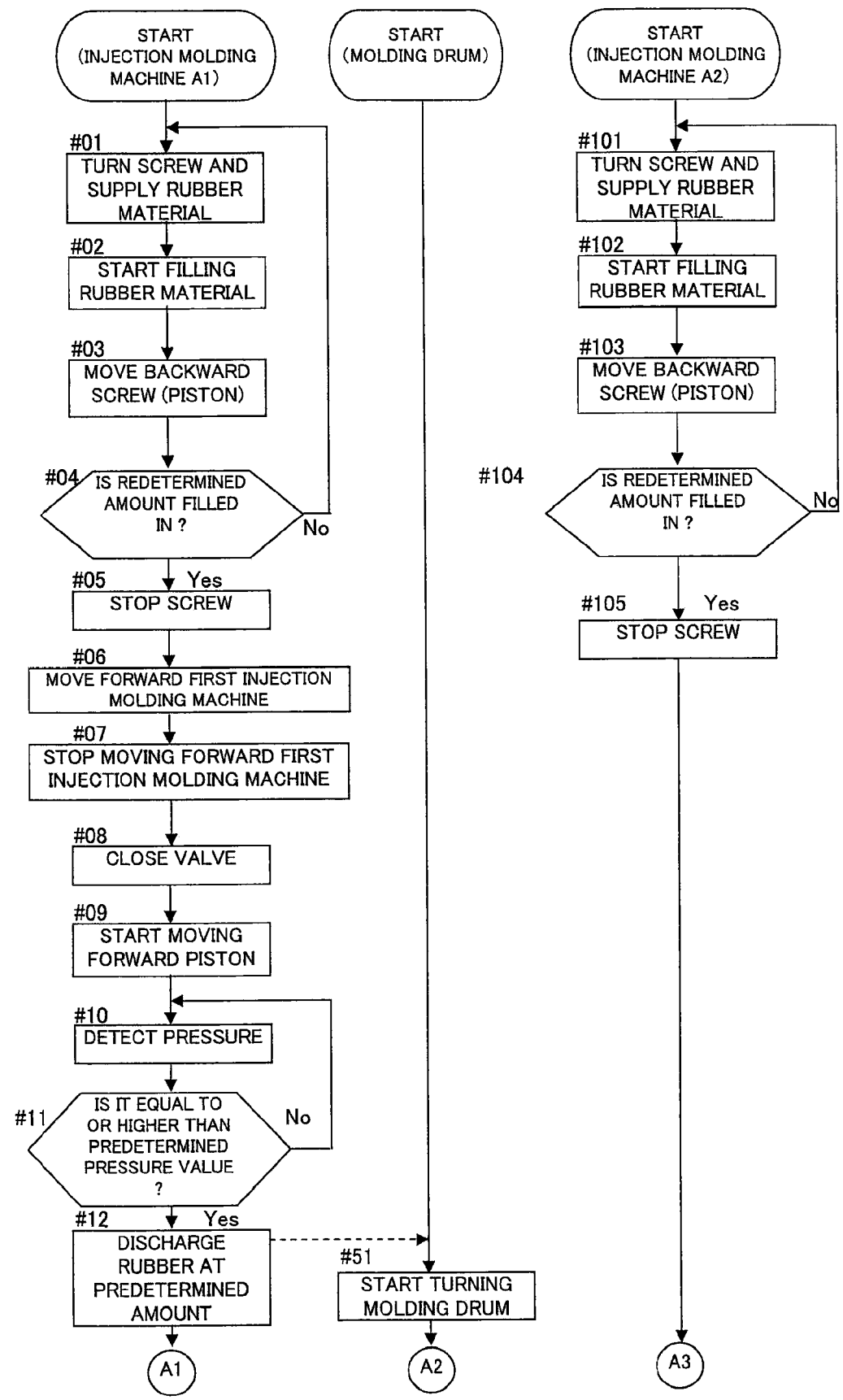
FIG. 6A is a flow chart (1) explaining a tire manufacturing step.
Figure 6B:
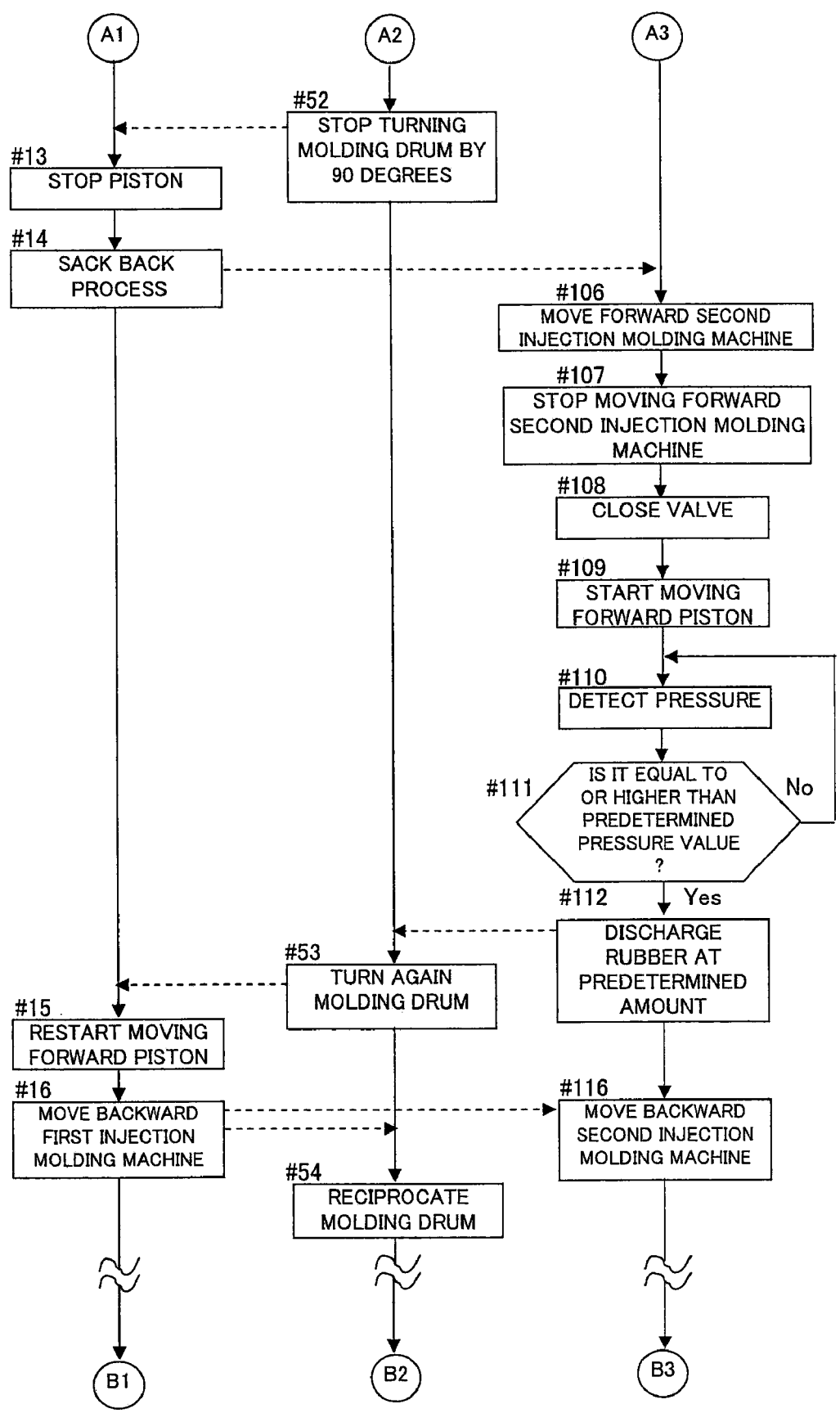
FIG. 6B is a flow chart (2) explaining the tire manufacturing step.
Figure 7:
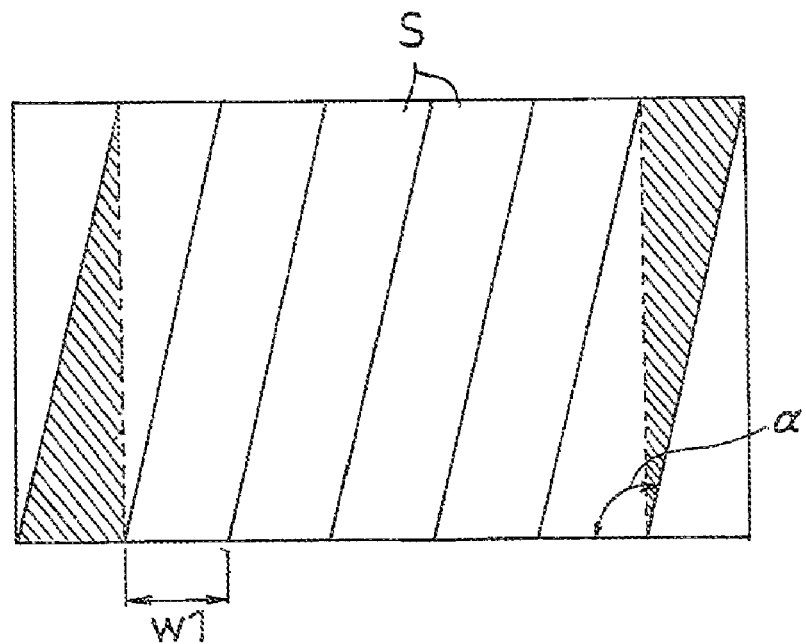
FIG. 7 is a view showing a winding aspect in accordance with a conventional art.
Figure 7:
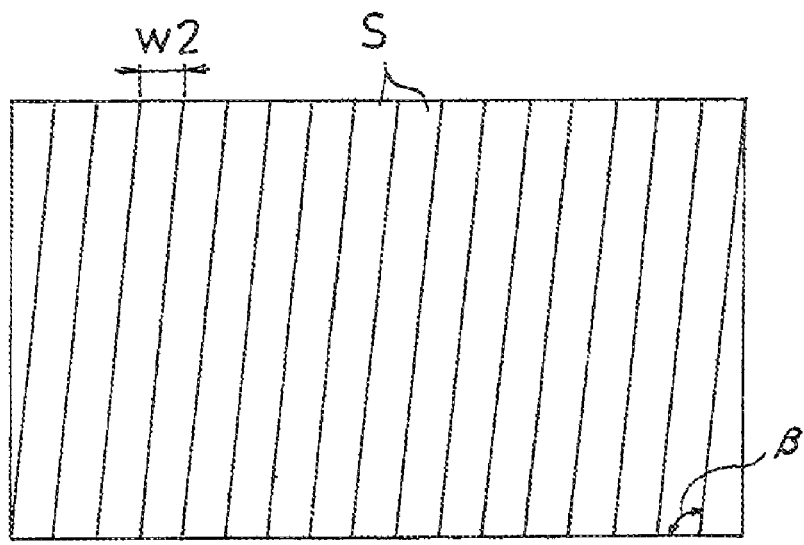

Next, a description will be given of a motion at a time of manufacturing a green tire by using the manufacturing equipment shown in FIGS. 1 and 2. FIG. 4 is a view explaining a motion of the injection molding machines A1 and A2 and the molding drum B. FIG. 5 is a view showing an internal motion of the injection molding machine. FIG. 6 is a flow chart explaining a motion.

Figure 4A:
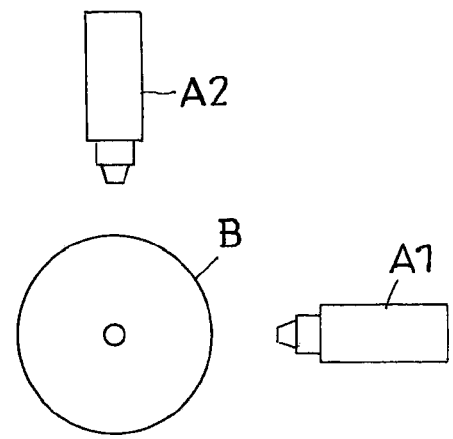
FIG. 4A is a view (1) explaining a motion of the injection molding machine and the molding drum at a time of manufacturing a tire.

First of all, it is necessary to weigh the rubber material on a scale, in each of the injection molding machines A1 and A2. The first and second injection molding machines A1 and A2 have the same structure, and the same amount of rubber material is weighed. As shown in FIG. 4A, in an initial state, the molding drum B and each of the injection molding machines A1 and A2 come to a state in which they are away from each other at a predetermined interval in a drum diametrical direction. In the first injection molding machine A1, first of all, the screw 1 is held being turned and the rubber material is input from the material supply port 8 (#01). The input rubber material is discharged forward while being mixed by the turning screw 1. Further, the chuck valve 3 is in an open state, and the rubber material is filled in the material infilling chamber 4 through the material passage C in the leading end side of the screw 1 (#02). A state of an inner portion of the injection molding machine A1 is shown in FIG. 5A. An internal pressure of the rubber acts on the injection port during the rubber material being filled, however, the pressure does not become high to a pressure at which the rubber can be injected from the injection port 6a. Accordingly, the rubber material is not discharged from the injection port 6a during the rubber material being filled.

If the rubber material is filled in the material infilling chamber 4, the piston P is moved backward little by little based on the pressure of the filled rubber (#03). At this time, not only the screw 1 but also the first cylinder 2 is moved backward together with the screw 1. Accordingly, the material supply port 8 integrally formed with the first cylinder 2 is moved backward together. Therefore, a relative positional relation between the screw 1 and the material supply port 8 is not changed during the rubber material being filled. Accordingly, the rubber material is fed in the material infilling chamber 4 always in the same mixed state regardless of a timing at which the rubber material is input. Further, since the precedently supplied rubber material is filled from the leading side of the material infilling chamber 4, the injection molding machine A has a first-in first-out type structure.

If the screw 1 is going to be moved backward, an amount of movement is detected by the encoder. The amount of movement of the screw 1 has a linear relationship to the amount of the supplied rubber material. Accordingly, the step determines based on the amount of movement of the screw 1 whether or not a predetermined amount of rubber material is supplied (#04), and the step stops the rotation of the screw 1 if it is detected that the predetermined amount is supplied (#05). The control is carried out by a function of the control portion 27. In accordance with the steps mentioned above, the weighing of the material is finished (refer to FIG. 5B).

Figure 4B:
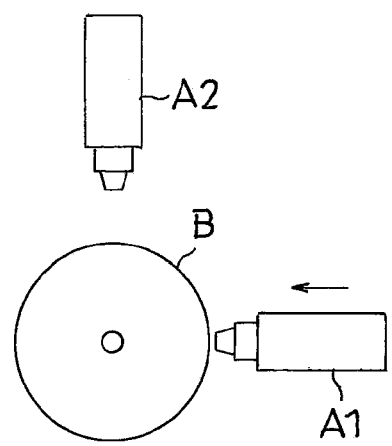
FIG. 4B is a view (2) explaining the motion of the injection molding machine and the molding drum at a time of manufacturing the tire.

Next, the step moves forward a whole of the first injection molding machine A1 by the drive apparatus 25 (#06). As shown in FIG. 4B, the step stops in a state in which the injection port 6a of the first injection molding machine A comes close to the surface of the molding drum B (#07). It is preferable to set an interval between the mouth piece 6 and the surface of the molding drum B at this time to some millimeters level. It is possible to detect the fact that the first injection molding machine A1 comes close to a predetermined position, based on the amount of movement of a whole of the first injection molding machine A by the drive apparatus 25. Alternatively, it may be detected by providing an independent proximity sensor.

The step closes the material passage C by driving the chuck valve 3 after stopping the first injection molding machine A1 (#08). This state is shown in FIG. 5C. At this time, the leading end side of the chuck valve 3 and the leading end surface 2a of the first cylinder 2 serve as a pressing surface of the piston P. It is possible to secure a larger pressing surface by closing the chuck valve 3.

Next, the step moves forward the piston P by driving the piston drive portion 21 (#09). Accordingly, the screw 1, the first cylinder 2, the chuck valve 3 or the like are integrally moved forward. At the same time, the step detects the rubber pressure in the vicinity of the injection port 6a by the pressure sensor 7 (#10). This is because even if the piston P is moved forward, the strip rubber S is not immediately injected, but the strip rubber S is injected only after the pressure reaches the predetermined value. In other words, the injection start time point of the strip rubber S is detected by the pressure sensor 7. The predetermined value can be previously set.

Figure 4C:
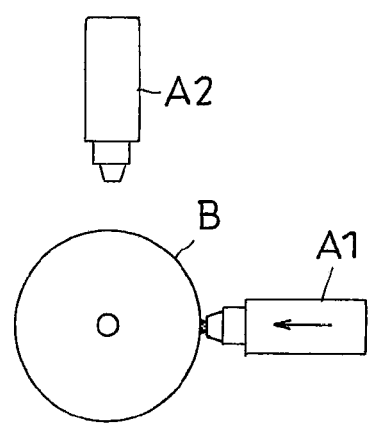
FIG. 4C is a view (3) explaining the motion of the injection molding machine and the molding drum at a time of manufacturing the tire.
Figure 4D:
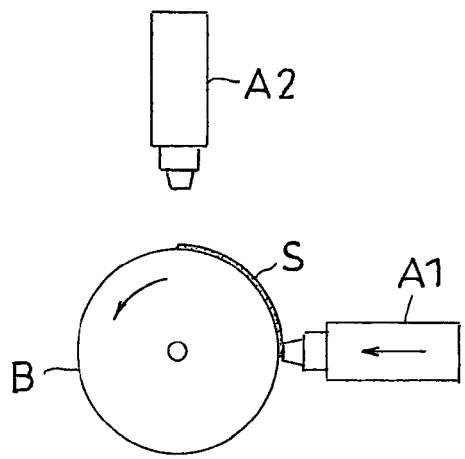
FIG. 4D is a view (4) explaining the motion of the injection molding machine and the molding drum at a time of manufacturing the tire.

If it is detected that the pressure value becomes equal to or higher than the predetermined value (#11), the strip rubber S having the predetermined cross sectional shape is injected from the injection port 6a (#12) (refer to FIG. 4C). The rotation of the molding drum B is started after the predetermined amount of strip rubber s is injected (#51). Further, the rotation of the molding drum B is controlled in synchronous with the movement of the piston P. In other words, at an accelerating time when the piston P begins to move, the similar accelerating motion is carried out by the molding drum B, and the rotation of the molding drum B becomes a fixed speed if the piston P comes to a fixed speed. The motion at a decelerating time is similar. Accordingly, it is possible to wind the strip rubber around the molding drum B at a fixed tension.

The step stops the molding drum B at a time point of turning the molding drum B by 90 degrees (#52). Accordingly, the strip rubber at an angle 90 degrees is wound by the first injection molding machine A1 (refer to FIG. 4D). In this case, the injection port 6a of the first injection molding machine A1 is in a state in which the injection port 6a leaves coming close to the surface of the molding drum B, during the angle of 90 degrees.

The step stops the piston of the first injection molding machine A1 just after stopping the molding drum B (or at the same time as the stop) (#13). Accordingly, the discharge of the strip rubber from the first injection molding machine A1 is temporarily stopped. Next, the step carries out a suck back process (#14). The suck back means a process for preventing the rubber material from dripping off from the injection port 6a due to a residual pressure within the material infilling chamber 4 even after the injection by the pressing of the piston P is finished. It is possible to do away with a dripping of the rubber material by removing the residual pressure based on the suck back. Specifically, it means a motion for moving backward the piston P at a predetermined amount after temporarily stopping the piston P. The internal pressure is detected by the pressure sensor 7 during the backward movement of the piston P, and the piston P is stopped if it is detected that the pressure value is lowered to the predetermined value or less. The predetermined value can be previously set. The suck back process is finished in accordance with the manner mentioned above.

On the other hand, steps #101 to #105 are carried out in the second injection molding machine A2, and the weighing of the rubber material is finished. This motion is the same as the steps #01 to #05 of the first injection molding machine A1. It is sufficient that the steps to the step #105 are carried out until the suck back process in the step #14 is finished. Accordingly, it is not always necessary to carry out the weighing of the rubber material at the same time of the first injection molding machine A1.

Figure 4E:
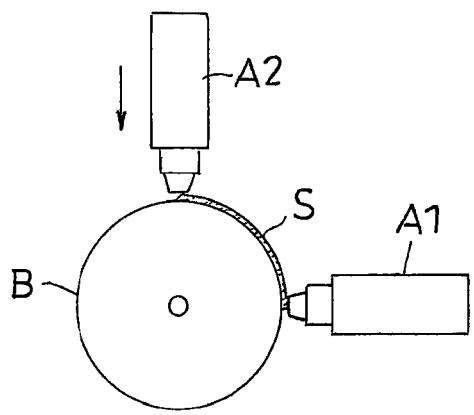
FIG. 4E is a view (5) explaining the motion of the injection molding machine and the molding drum at a time of manufacturing the tire.
Figure 4F:
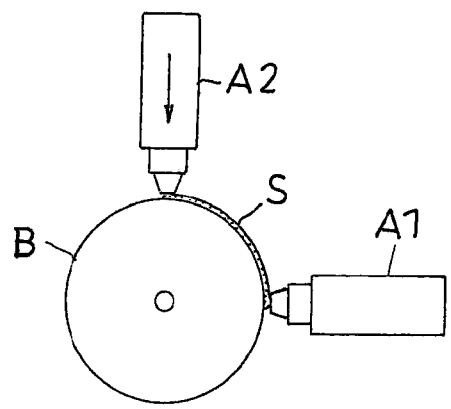
FIG. 4F is a view (6) explaining the motion of the injection molding machine and the molding drum at a time of manufacturing the tire.
Figure 4G:
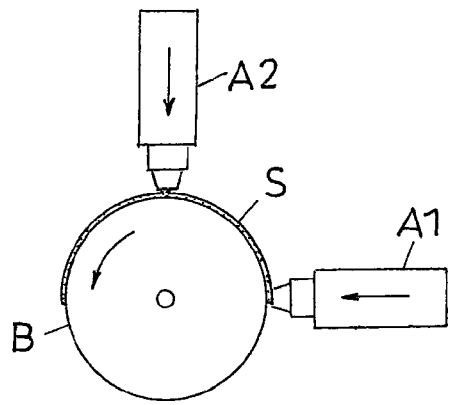
FIG. 4G is a view (7) explaining the motion of the injection molding machine and the molding drum at a time of manufacturing the tire.

The step moves forward a whole of the second injection molding machine A2 by the drive apparatus just after or the suck back process in the step #14 is finished or at the same time of the finish (#106). The following steps (#106 to #112) until discharging the strip rubber S are the same as the case (#06 to #12) of the first injection molding machine A1. A state of the step #107 is shown in FIG. 4E, and a state of the step #112 is shown in FIG. 4F.

Next, the rotation of the forming drum B is again started (#53). The piston of the first injection molding machine A1 restarts moving forward at the same time of the rotation or just after the rotation (#15). Accordingly, the discharge of the strip rubber S by the first injection molding machine A1 is restarted. Thereafter, the discharges of the strip rubber S by the first injection molding machine A1 and the second injection molding machine A2 are simultaneously carried out (refer to FIG. 4G).

Figure 4H:
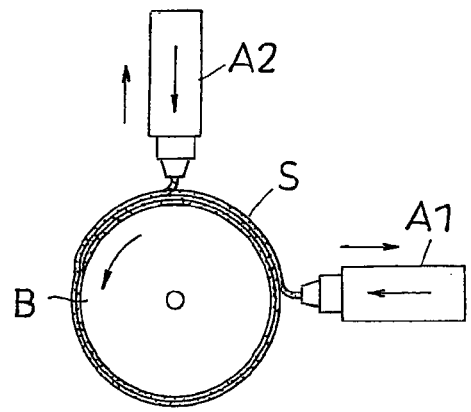
FIG. 4H is a view (8) explaining the motion of the injection molding machine and the molding drum at a time of manufacturing the tire.
Figure 4I:
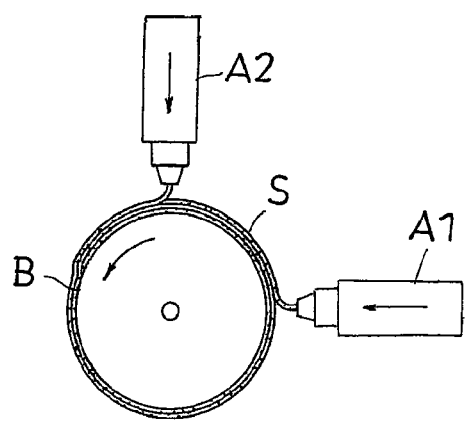
FIG. 4I is a view (9) explaining the motion of the injection molding machine and the molding drum at a time of manufacturing the tire.
Figure 4J:
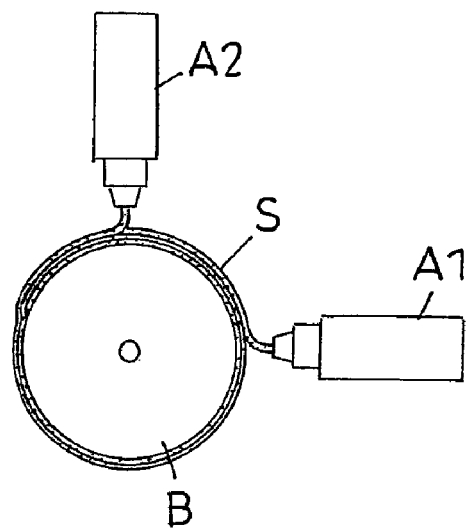
FIG. 4J is a view (10) explaining the motion of the injection molding machine and the molding drum at a time of manufacturing the tire.
Figure 4K:
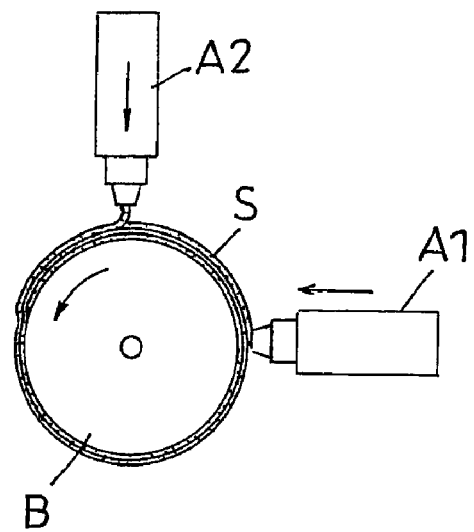
FIG. 4K is a view (11) explaining the motion of the injection molding machine and the molding drum at a time of manufacturing the tire.

Further, if the rotational drive of the molding drum B is started, the step moves backward the first and second injection molding machines A1 and A2 to a predetermined position (#16 and #106) (refer to FIG. 4H). The amount of movement at a time of moving backward can be controlled in the same manner as mentioned above. If the strip rubber S is wound around the molding drum B, an outer diameter is increased little by little. Taking this point into consideration, each of the injection molding machines A1 and A2 is moved in such a manner as to prevent the movements of the mouth piece 6 and the molding drum B from interfering. It is possible to previously set what position they are moved backward to.

If the piston P is moved forward to the predetermined position, a reciprocation of the molding drum B is started by the width direction drive portion 26b (#54). This start point corresponds to a state in which the winding of the strip rubber S approximately one batch. Thereafter, the reciprocating drive control of the molding drum B is carried out in accordance with a preset program, and a tire shape is formed on the molding drum B.

Next, a description will be given of a motion at a time of finishing the winding step of the strip rubber S. In the winding step, each of the pistons of the first and second injection molding machines A1 and A2 carries on moving forward (refer to FIGS. 4I and 5D). Further, if it is detected that each of the pistons P moves forward to the predetermined position (#17 and #117), the step simultaneously starts the deceleration of each of the pistons P (#18 and #118). The predetermined position can be previously set, and it is possible to detect the predetermined position based on the amount of movement of the piston P. Further, the molding drum B simultaneously starts decelerating (#55).

In this case, the position of the piston P set in the steps #7 and #117 is different between the first injection molding machine A1 and the second injection molding machine A2. In other words, since the first injection molding machine A1 is driven in advance, the detection position is different by the advance amount. In this case, since it is necessary that the detections in the steps #7 and #117 are simultaneously carried out, it is sufficient to detect only the position of one piston. For example, if it is detected that the position of the piston of the first injection molding machine A1 moves forward to the predetermined position, the step decelerates the piston P of the first injection molding machine A1 based on this detection, and the piston P of the second injection molding machine A2 starts decelerating. The deceleration of the molding drum B is carried out while working with the piston.

After decelerating each of the pistons P, each of the pistons P simultaneously stops (#19 and #119). The molding drum B also stops (#56) (refer to FIG. 4J). It is preferable to stop the molding drum B at the same time of stopping each of the pistons P, or just before stopping each of the pistons P. That is for preventing an additional tension from being applied to the strip rubber.

Since the first injection molding machine A1 is in the state in which the discharge of the predetermined amount of rubber material is all finished, there is no step of moving forward the piston P any more. On the other hand, the second injection molding machine A2 is in a stage in which the discharge of the predetermined amount of rubber material is not all finished. Accordingly, there remains the step of moving forward the piston P.

Next, the suck back process is simultaneously carried out in the first and second injection molding machines A1 and A2 (#20 and #120). With regard to the suck back, the same motion as described in the step #14 is carried out.

At the same time or approximately at the same time of the suck back process, a whole of the first injection molding machine A1 is moved forward so as to be moved close to the surface of the molding drum B (#21). At the same time, the second injection molding machine A2 restarts moving forward the piston P (#121). In this connection, the second injection molding machine A2 is not moved forward, and the current position thereof is maintained. At the same time of the steps #21 and #121, the molding drum B is turned again in the counterclockwise direction (#57).

Since the first injection molding machine A1 comes close while the molding drum B turns, no slack is generated between the surface of the molding drum B and the injection port 6a of the first injection molding machine A1. Further, the forward moving speed of the first injection molding machine A1 is set in such a manner that the slack is not generated. On the other hand, the discharge of the strip rubber S is carried on in the second injection molding machine A2 (refer to FIG. 4K).

If the mouth piece 6 of the first injection molding machine A1 comes close to the predetermined position, the rotation of the molding drum B is stopped (#58). Just after this, the forward movement of the first injection molding machine A1 is stopped (#22). At this time, the surface of the mouth piece 6 of the first injection molding machine A1 comes into contact with the strip rubber S wound around the surface of the molding drum B (#23). On the other hand, the forward movement of the piston P of the second injection molding machine A2 is stopped at the same time of the stop of the forward movement of the first injection molding machine A1 (#122). Accordingly, the discharge of the predetermined amount of rubber material is finished in the second injection molding machine A2. Next, the suck back process of the second injection molding machine A2 is carried out (#123). The contents of this process is the same as the already described contents.

Figure 4L:
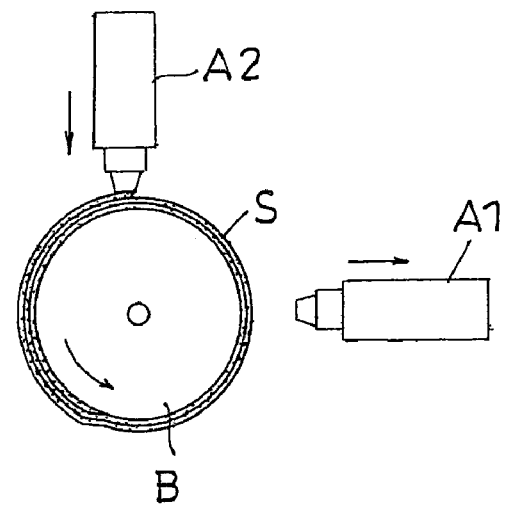
FIG. 4L is a view (12) explaining the motion of the injection molding machine and the molding drum at a time of manufacturing the tire.

Next, the first injection molding machine A1 is again moved backward (#24). It takes the form of again keeping the mouth piece 6 away after bringing the mouth piece 6 into contact with the strip rubber S, and it is possible to smoothly detach the mouth piece 6 from the wound strip rubber S. In other words, it is possible to detach the rubber without applying an unreasonable force to the strip rubber S. This state is shown in FIG. 4L. In accordance with the manner mentioned above, the winding motion of the strip rubber by the first injection molding machine A1 is substantially finished.

The forward movement of the second injection molding machine A2 is started at the same time or approximately at the same time of the backward movement of the first injection molding machine A1 (#124). The thereafter motion becomes identical to the motion after the step #21 in the first injection molding machine A1. In other words, since the second injection molding machine A2 is operated behind the first injection molding machine A1, the thereafter motion becomes the motion obtained only by the second injection molding machine A2.

Figure 4M:
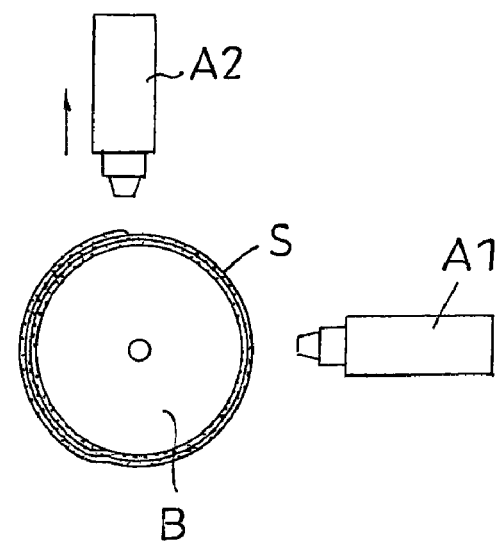
FIG. 4M is a view (13) explaining the motion of the injection molding machine and the molding drum at a time of manufacturing the tire.

The re-rotation and the stop of the molding drum B in the steps #59 and #60 have the same contents as those in the steps #57 and #58. The motions of the steps #125 to #127 have the same contents as the motions of the steps #22 to #24. A state of the step #127 is shown in FIG. 4M.

In accordance with the manner mentioned above, the winding motion of the predetermined amount of rubber material filled in the material infilling chamber 4 is finished. In the case of continuously carrying out the winding motion, it is preferable to repeat the above motions. In accordance with the structure of the present invention, the degree of mixing until the rubber material is filled in the material infilling chamber after the rubber material is supplied is constant regardless of the timing at which the rubber material is input. In accordance with the structure of the present invention, since the degree of mixing and the degree of plasticity of the rubber can be fixed regardless of the supply timing of the rubber, it is possible to improve a uniformity of the manufactured tire.

Further, since the winding motion is carried out while discharging the strip rubber S simultaneously by using two injection molding machines A1 and A2, it is possible to quicken the manufacturing time of the green tire. Further, it is possible to make the winding angle as small as possible (the aspect that the angle β is close to 90 degrees) without necessity of increasing the width of the strip rubber S. Accordingly, it is possible to make the uniformity of the manufactured tire good.

OTHER EMBODIMENTS

The structure of the manufacturing equipment and the tire manufacturing step which are described in the present embodiment only show one example, and various modified examples can be considered. For example, with regard to the internal structures of the injection molding machines A1 and A2 and the drive mechanism of the piston P, various modified embodiments can be considered. With regard to the installation directions of the injection molding machines A1 and A2, they can be installed diagonally or vertically in addition to the horizontal installation. The material passage C may be closed by the chuck valve 3 before moving forward the injection molding machine A1 in the step #6.

In the present embodiment, the strip rubber is discharged by using two injection molding machines, however, three or more injection molding machines may be used. In the case of arranging three of more injection molding machines, it is possible to appropriately define by taking the layout space or the like into consideration what degree of phase they are shifted in the peripheral direction.

In the present embodiment, two injection molding machines are arranged so as to shift their phases by 90 degrees in the drum peripheral direction, however, the phase can be appropriately defined, and it is preferable to set the phase between 90 degrees and 180 degrees.

In the present embodiment, at a time of winding the first 90 degrees by the first injection molding machine A1, it is carried out without moving backward the first injection molding machine A1, however, it may be carried out by moving backward such as the step #16.

In the present embodiment, the description is given by exemplifying the injection molding machine as the rubber discharge apparatus, however, a rubber mixing extruder may be used. In the case of the extruder, it is possible to continuously discharge the strip rubber. Further, the extruder may employ an extruder of a type having a gear pump, or may employ an extruder having no gear pump.

In the present embodiment, there are used two injection molding machines having absolutely the same structure, however, there may be used a plurality of injection molding machines having different structures. Further, the injection molding machine and the extruder may be mixed.

What is claimed is:

1. A tire manufacturing method for forming a tire shape by discharging a strip rubber having a predetermined cross sectional shape by a rubber discharging apparatus while turning a molding drum, and sequentially winding the discharged strip rubber around the molding drum, comprising a step of arranging at least two rubber discharging apparatuses including a first rubber discharging apparatus and a second rubber discharging apparatus around a diametrical direction of the molding drum in a state in which phases are shifted in a peripheral direction, and winding in a state of overlapping a first strip rubber discharged from the first rubber discharging apparatus and a second strip rubber discharged from the second rubber discharging apparatus made of the same rubber material as the first strip rubber at a predetermined amount in a width direction of the molding drum, further comprising a step of bringing the first rubber discharging apparatus close to a surface of the molding drum from a state in which the first and second rubber discharging apparatuses are spaced from the molding drum at a predetermined interval in a drum diametrical direction, wherein the first and second rubber discharging apparatuses are configured so that a rotation of the molding drum is started after a discharge of the first strip rubber is started, and further comprising a step of detecting a fact that an end portion of the first strip rubber wound by the first rubber discharging apparatus reaches a position of the second rubber discharging apparatus, and stopping the rotation of the molding drum, and further comprising steps of stopping the discharge of the first strip rubber just after, or at the same time as, stopping the molding drum, subsequently carrying out a suck back process of the first rubber discharging apparatus, bringing the second rubber discharging apparatus close to the surface of the molding drum just after, or at the same time as, the suck back process is finished, restarting the rotation of the molding drum after a discharge of the second strip rubber is started, and at the same time as this restarting of the rotation, or shortly thereafter, restarting the discharge of the first strip rubber by the first rubber discharging apparatus, reciprocating the molding drum while discharging the first and second strip rubbers to form a tire shape on the molding drum, stopping the discharge of the first and second strip rubbers at the same time of stopping the rotation of the molding drum, subsequently, carrying out a second suck back process, of the first and second rubber discharging apparatuses, at the same time or approximately at the same time as carrying out the second suck back process, moving the first rubber discharging apparatus forward so as to be moved close to the surface of the molding drum, simultaneously starting the discharge of the second strip rubber and restarting the rotation of the molding drum, stopping the rotation of the molding drum if a mouth piece of the first rubber discharging apparatus comes close to a predetermined position, subsequently, stopping the forward movement of the first rubber discharging apparatus so that at this time a surface of the mouth piece of the first rubber discharging apparatus comes into contact with the first strip rubber wound around the surface of the molding drum, stopping the discharge of the second strip rubber at the same time of the stop of the forward movement of the first rubber discharging apparatus, subsequently, carrying out a further suck back process of the second rubber discharging apparatus, moving the first rubber discharging apparatus backward and, at the same time or approximately at the same time of moving the first rubber discharging apparatus backward, moving the second rubber discharging apparatus forward so as to be moved close to the surface of the molding drum, and restarting the rotation of the molding drum, stopping the rotation of the molding drum if a mouth piece of the second rubber discharging apparatus comes close to a predetermined position, subsequently, stopping the forward movement of the second rubber discharging apparatus so that at this time a surface of the mouth piece of the second rubber discharging apparatus comes into contact with the second strip rubber wound around the surface of the molding drum, and moving the second rubber discharging apparatus backward.

2. The tire manufacturing method as claimed in claim 1, wherein the first rubber discharging apparatus and the second rubber discharging apparatus are arranged in the peripheral direction of the molding drum in such a manner that their phases are shifted by 90 degrees to 180 degrees.

3. The tire manufacturing method as claimed in claim 1, wherein the rubber discharging apparatuses are constituted by rubber injection molding machines.

4. The tire manufacturing method as claimed in claim 1, wherein the positioning of the second rubber discharging apparatus in the width direction of the molding drum is offset by a preselected distance as compared to the positioning of the first rubber discharging apparatus.

5. The tire manufacturing method as claimed in claim 1 wherein the first strip rubber and the second strip rubber are partially overlapped.

6. The tire manufacturing method as claimed in claim 1 comprising a step of detecting the fact that the end portion of the first strip rubber reaches the position of the second rubber discharging apparatus by detecting a fact that an angular degree of the rotation of the molding drum becomes equivalent to the degree in which the phases are shifted.

* * * * *

UNITED STATES PATENT AND TRADEMARK OFFICE
CERTIFICATE OF CORRECTION

PATENT NO. : 8,366,851 B2  Page 1 of 1
APPLICATION NO. : 12/438379
DATED : February 5, 2013
INVENTOR(S) : Matsuoka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 318 days.

Signed and Sealed this
First Day of September, 2015

Michelle K. Lee
*Director of the United States Patent and Trademark Office*